No. 826,850. PATENTED JULY 24, 1906.
E. HAYNES.
GEARING.
APPLICATION FILED JAN. 15, 1906.
2 SHEETS—SHEET 1.
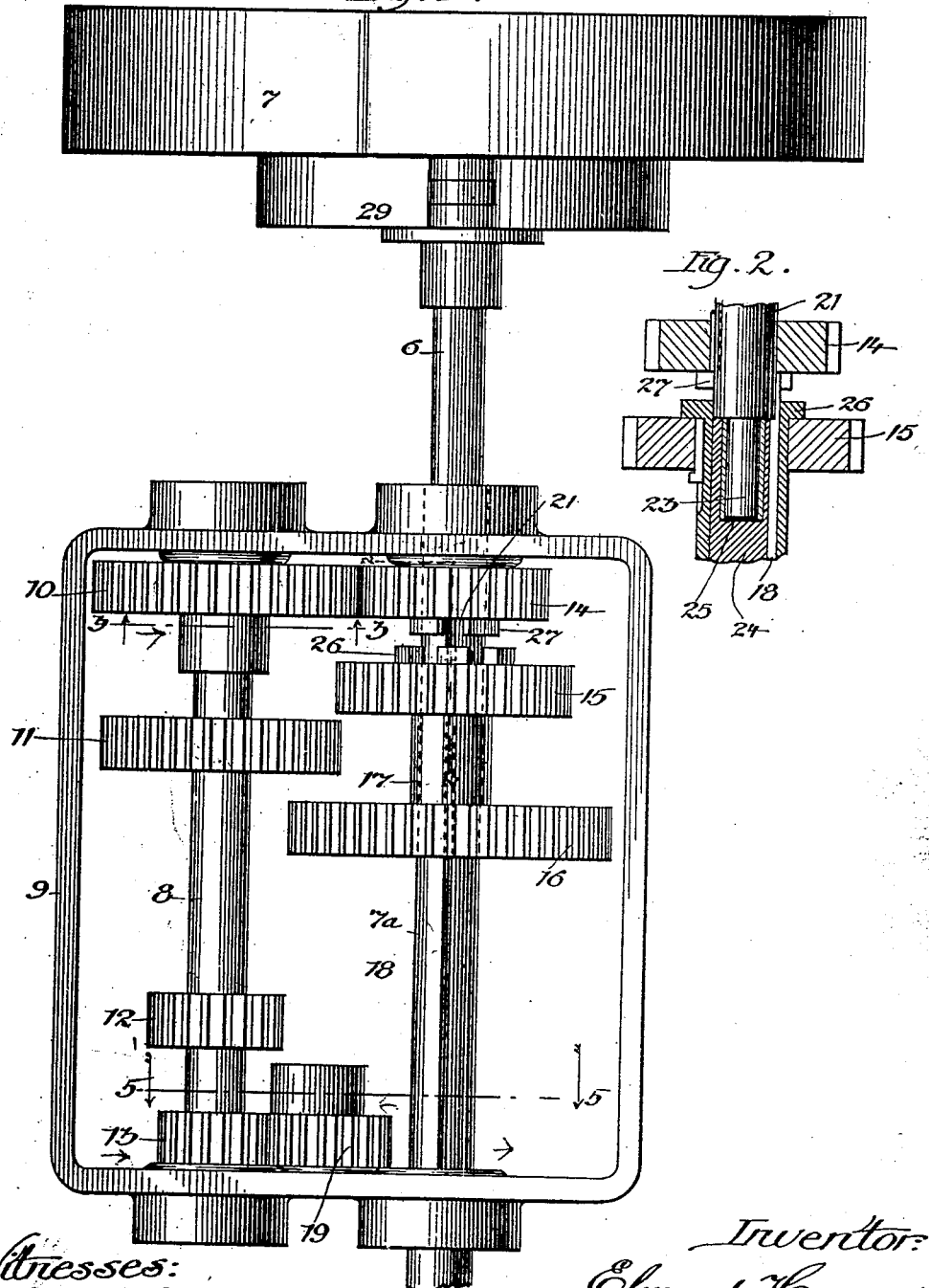
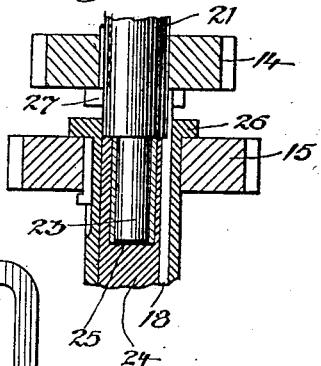

No. 826,850. PATENTED JULY 24, 1906.
E. HAYNES.
GEARING.
APPLICATION FILED JAN. 15, 1906.
2 SHEETS—SHEET 2.
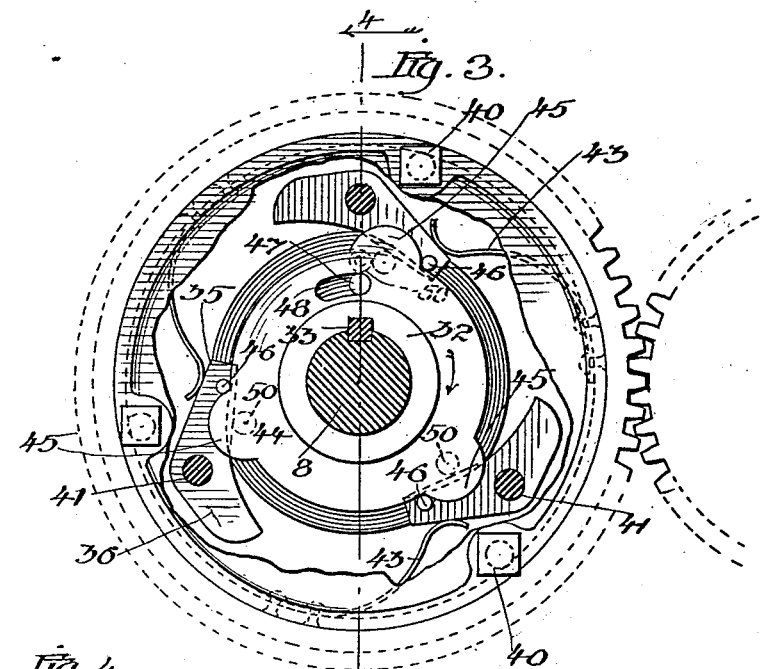
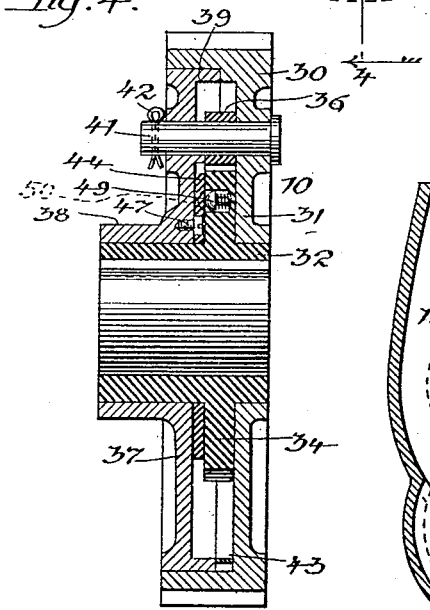
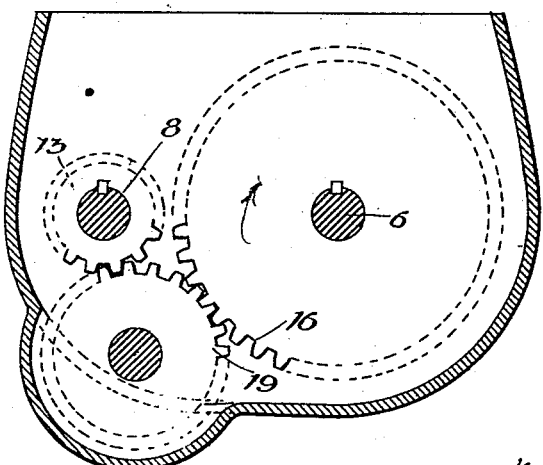
Witnesses:
Frank Blanchard
W. H. Hall
Inventor:
Elwood Haynes.
By Poole Brown,
Attorneys

UNITED STATES PATENT OFFICE.

ELWOOD HAYNES, OF KOKOMO, INDIANA.

GEARING.

No. 826,850.　　　Specification of Letters Patent.　　　Patented July 24, 1906.

Application filed January 15, 1906. Serial No. 296,178.

*To all whom it may concern:*

Be it known that I, ELWOOD HAYNES, a citizen of the United States, residing at Kokomo, in the county of Howard and State of Indiana, have invented certain new and useful Improvements in Gearing; and I do hereby declare that the following is a full, clear, and exact description thereof, reference being had to the accompanying drawings, and to the figures of reference marked thereon, which form a part of this specification.

This invention relates to improvements in gearing designed for use in change-speed transmission mechanisms for motor-vehicles or other machines, and refers more specifically to that form of such gearing embracing stationary and sliding spur-gears, the sliding gears being shifted from one stationary gear to another to vary the speed of the vehicle or other machine.

The invention consists in the matters hereinafter set forth, and more particularly pointed out in the appended claims.

Among the objects of my invention is to provide a certain method of shifting the gear to change the speed, especially from a higher to a lower speed, while insuring prompt release and reëngagement of the gears, and therefore enable the change to be made without loss of time and without danger of injuring the gears by stripping the teeth thereof or otherwise.

As shown in the drawings, Figure 1 is a plan view of the essential elements of a transmission mechanism embodying my invention. Fig. 2 is a detail section taken on line 2 2 of Fig. 1. Fig. 3 is a cross-section taken on line 3 3 of Fig. 1 with parts broken away. Fig. 4 is an axial section of the gear shown in Fig. 3. Fig. 5 is a cross-section taken on line 5 5 of Fig. 1, illustrating the reversing-gear mechanism and the casing surrounding the same.

I have shown in the drawings only the essential features constituting the transmission mechanism, and for sake of simplicity and clearness of illustration have omitted the motor and chassis of the vehicle and the manner of mounting the transmission-gear on said chassis.

As shown in said drawings, 6 designates the power-shaft of the motor; 7, the fly-wheel; $7^a$, the main shaft of the transmission-gear; 8, a counter-shaft which is located approximately in the horizontal plane of the main shaft $7^a$, and 9 a generally rectangular frame in which the main shaft and counter-shaft have bearing. The counter-shaft carries four gears 10, 11, 12, and 13, fixed thereto, the motor-shaft carries one gear 14, keyed to the shaft and meshing with the gear 10, while the main shaft $7^a$ carries two gears 15 and 16. The gear-wheels 15 and 16 are fixed to a sleeve 17, that slides endwise on the main shaft. Said sleeve 17 is non-rotative on the shaft $7^a$. Said shaft may either be made of angular cross-section or provided with a keyway 18, as herein shown, adapted for engagement by a key on the sleeve. The gear-wheel 14 of the motor-shaft drives the counter-shaft, and the gear-wheels 15 and 16 are shifted endwise of the shaft $7^a$ and are thereby brought successively into mesh with the gear-wheels 11 and 12 to drive the main shaft at the intermediate and slow speed of the gear. Further shifting of the gear 17 into mesh with the reversing-gear 19, that meshes with the gear 13 on the counter-shaft, reverses the mechanism. The motor-shaft 6 and main shaft $7^a$ rotate independently of each other when power is transmitted through the counter-shaft and are adapted to be locked together by a suitable clutch mechanism, hereinafter described, to transmit the driving power direct for the highest gear of the mechanism. To this end the motor-shaft is provided with a reduced portion 23, which has bearing in an axial socket 25 of the main shaft. The clutch by which said shafts are adapted to be locked together consists of two clutch members 26 27, the former fixed to the end of the sleeve 17 and the latter fixed to or made part of the gear-wheel 14. The sleeve 17 is adapted to be connected in any suitable manner (not shown) with a hand-lever located accessible to the seat of the driver of the vehicle.

It is common in this class of transmission mechanisms to provide a clutch device 29, interposed between the motor and the power-shaft 6, whereby the motor may be temporarily cut off from the transmission-gear at a time when the gear of the mechanism is to be varied. As herein shown, said clutch is shown as located just inside the fly-wheel 7 and in practice is adapted to be actuated through the medium of a suitable foot-lever. (Not shown.)

The construction of the mechanism thus far described is generally the same as prior constructions which have been heretofore in use.

When the vehicle is standing still, the sleeve 17, carrying the gears 15 and 16 and one member of the clutch, is in the position indicated in Fig. 1. Assuming that the motor is in operation, it is the practice in operating the mechanism as heretofore constructed in order to bring the sliding gears 16 and 17 into mesh with their mating gears or to bring the clutch members 26 and 27 into operative position to first operate the clutch 29 to release the motor from the driving mechanism and thereafter shift the sleeve 17 and the parts carried thereby into the position desired, after which the clutch 29 is operated to connect the motor with the transmission mechanism. Such release of the motor from the transmission mechanism is required under all circumstances by the prior construction by reason of the fact that in such prior constructions the counter-shaft 8 is in compulsory rotation with the motor so long as the clutch 29 is in operative position, while the gears 15 and 16 are in compulsory rotation with the vehicle when free from their mating gears on the counter-shaft 8. Unless the speeds of two gears to be brought into mesh are therefore practically uniform or harmonious such gears cannot be brought into mesh under the usual running conditions of the vehicle without liability of damaging the same. Moreover, the operation of changing the gear of the prior construction cannot be rapidly effected with safety inasmuch as the construction and operation are not favorable to instantaneous release and reëngagement of the shifting elements of the gear. My improvements are designed to insure a certain method of changing the gear, especially from higher to the lower speeds, with a prompt or instantaneous release and reëngagement of the movable elements of the change-speed gear and without danger of injuring the mechanism. My improved mechanism may be changed to vary the speed of the vehicle under favorable conditions without disconnecting the motor from the mechanism if such change be made with promptness and may be made under other circumstances by temporarily slowing down the motor without disconnecting the motor from the transmission mechanism. In some instances it may be necessary to temporarily disconnect the motor from the driving mechanism; but such temporary disconnection need only be momentary and does not prolong or delay the change or adjustment of the gears. Said improved result is effected by interposing between the motor-shaft and the counter-shaft a ratchet mechanism or its equivalent so arranged as to render it impossible to communicate the momentum of the vehicle to the motor, while, on the other hand, permitting the motor to always communicate its power to the vehicle. Said ratchet mechanism is herein shown as embodied in the construction of the gear-wheel 10 on the counter-shaft and is made as follows: The toothed rim 30 of said gear-wheel 10 is formed on a web or plate 31, that is mounted and capable of rotation on a hub 32, affixed to the shaft 8 by a key 33 or otherwise. The said hub or sleeve 32 is provided with an annular radial flange 34, the periphery of which is formed to provide ratchet-teeth 35, which are engaged by pawls 36, carried by the outer portion of the wheel. The said toothed flange of the hub and the pawls are inclosed in a chamber formed on one side by said web or plate 31 and on its other side by a like web or plate 37, having a central tubular extension 38, surrounding the hub 32. Said side members or webs of the gear-wheel are fixed together by means of screw-bolts 40. The web or plate 37 is provided at its outer margin with an inwardly-directed or annular flange 39, which fits within the annular rim 30 of said gear-wheel 10. The pawls 36 are pivotally mounted on pins 41, that extend through openings in the side webs or plates of the gear-wheel and are fixed in place, as herein shown, by cotter-pins 42. The said pawls are preferably balanced on said pivot-pins 41, so that the momentum due to the rotation of the wheel does not tend to throw the pawls out of operative position. The pawls are held in operative position or in position to engage the teeth of the flange 34 by means of springs 43, herein shown as having the form of flat leaf-springs that are attached at their outer ends to the inner face of the rim 30 and bear at their inner ends against the operative or advance ends of the pawls. In order to avoid clicking noise of the pawls riding over the teeth when the shaft rotates relatively to the rim of the wheel, I have provided means for temporarily raising said free or advance ends of the pawls during such relative rotation of the shaft and outer part of the wheel. As herein shown, this mechanism is made as follows: 44 designates a flat cam-ring that surrounds and has a limited rotation on the hub 32 of the gear-wheel and fits between one flat face of the ratchet-flange and the side member or web 37 of the gear-wheel. Said cam-ring is provided with a plurality of peripheral cam projections 45, one for each pawl, which are adapted upon slight angular displacement of the cam-ring to be moved beneath laterally-extending studs 46, carried by the free or advance ends of the pawls, and said cam-ring when thus turned acts to hold the pawls out of the path of the ratchet-teeth. The angular displacement of the cam-ring is permitted and limited by means of a slotted connection with the outer or continuously-rotating part of the wheel. Such connection consists in this instance of a pin 47, fixed in and extending inwardly from the inner face of the side member 37 of the wheel, Figs. 3 and 4, and engaging a curved slot 48 in the cam-ring concentric with the axis of the shaft 8. The length of said slot is sufficient to permit the cam projections 45 to move beneath the pins 46 of the pawl upon angular displacement of the ring sufficiently to raise the pawls out of the path of the teeth, and said cam-ring is limited to this extent of movement and remains stationary until the outer rim of the wheel begins to drive the inner part thereof. The means for shifting the cam-ring through its limited angular displacement consists, in this instance, of a spring-pressed pin 49, located in a recess in the ratchet-flange of the hub 32 of the wheel and bearing outwardly against the inner face of the cam-ring. The cam-ring is provided on its inner face with a plurality of shallow angularly-separated notches 50, located in the path of rotation of said spring-pressed pin 49. The pressure of the pin against said cam-ring need not necessarily in itself be sufficient to turn the ring; but when the pin strikes one of said recesses or notches a sufficient interlocking engagement is produced to shift the plate in a manner to bring the cam projections 45 beneath the studs of the pawls, and thereby lift the pawls out of the path of the ratchet-teeth 35. It will be observed that this action occurs at a time when the shaft 8 tends to rotate faster than the geared rim of the wheel 10 and when, therefore, the momentum of the vehicle tends to drive the motor. The ratchet interposed in the wheel 10 thus described avoids the transmission of driving power, due to the momentum of the vehicle, to the motor. When relative rotation of the shaft 8 to the outer part of the wheel changes—that is to say, when the outer part of the wheel begins to rotate faster than the shaft 8 and tends to drive the latter—the first movement of the outer part of the gear-wheel carries with it the cam-ring the limited distance of its angular displacement, together with the pawls, the pawls at this time being out of line with the ratchet-teeth. When the cam-ring has rotated a sufficient distance to bring the pin 47 against the forward end of the slot 48, the pawls in their continued movement ride off the cam projections of the cam-ring and engage the ratchet-teeth, whereupon power is transmitted to the shaft 8 through the geared portion of the wheel 10 in the usual manner.

When the vehicle tends to run faster than the motor, the gears 15 and 16 may under favorable conditions be shifted from a higher to a lower speed without the necessity of disconnecting the motor from the motor-shaft through the clutch 29, or if such disconnection be desirable it need only be momentary. If, for example, the vehicle is being driven through its direct drive and at its highest speed and the grade over which the vehicle is traveling to be too steep to operate the vehicle on the high gear, the gear 15 may be quickly thrown into mesh with its mating gear without substantial loss of time or momentum. Should the grade prove still too steep for the intermediate gear, the gear may be shifted for low speed by bringing the gear-wheel 16 into mesh with its mating gear 12. It has been found that by the use of the mechanism shown all danger of stripping the teeth from the gears in shifting from a higher to a lower speed is obviated, and said gears are certain to engage promptly when the sleeve 17 is moved to its proper position. The reason for this is due to the fact that the gears 11, 12, and 13 are practically free when not in driving engagement with the gears 15 and 16 and when operating under the conditions described—to wit, where the vehicle tends to drive the motor while the gears 15 and 16 are revolving under the impetus of the vehicle. When such change is made from a high to a lower gear under the condition described, engagement of the pawls with the ratchet-teeth does not take place until the vehicle has diminished its speed to that required by the speed of the motor, and the motor then assumes control of the vehicle gently and without abrupt action. In changing from a higher to a lower gear, even when ascending a steep hill, the momentum of the car may be preserved a sufficient length of time to make the change in the manner stated, and this may be assured by slightly diminishing the speed of the motor or by momentarily disconnecting the motor from the vehicle if found desirable. Under all conditions the release of the movable gears from and their reëngagement with the stationary gears is prompt for the reasons stated, so that changes from high to lower speeds may be effected without appreciable loss of momentum.

I claim as my invention—

1. In a transmission-gear for motor-vehicles, the combination with the motor-shaft, the driven shaft adapted for connection with the driving-wheels of the vehicle, of a change-speed transmission-gearing operatively interposed between the motor and driven shafts, including two sets of gears, one set of which is slidable to bring the gears thereof severally into mesh with the gears of the other set, said transmission-gearing comprising means for positively transmitting driving power from the motor-shaft to the driven shaft while preventing transmission of driving power from the driven shaft to the motor-shaft at a time when the driven shaft rotates forwardly.

2. In a transmission-gear for motor-vehicles, the combination with a motor-shaft, a main or driven shaft and a counter-shaft, of mating gear-wheels fixed non-rotative on the main or driven and counter shafts, the gears of one of said shafts being movable endwise of its shaft to bring the mating gears severally into mesh, and driving connections between the motor and counter shafts operating to drive the counter-shaft from the motor-shaft while preventing transmission of driving power from the counter-shaft to the motor-shaft.

3. In a transmission-gear for motor-vehicles, the combination with a motor-shaft, a main or driven shaft and a counter-shaft, of gear-wheels fixed to the counter-shaft, gear-wheels fixed non-rotative on the main or driving shaft and sliding endwise thereof and adapted to be shifted severally into mesh with the gear-wheels of the counter-shaft and driving connections between the motor and counter-shaft operating to drive the counter-shaft from the motor-shaft, while preventing the transmission of driving power from the main or driven shaft to the motor-shaft.

4. In a transmission-gear for motor-vehicles, the combination with a motor-shaft, a main or driven shaft and a counter-shaft, of mating gear-wheels fixed non-rotative on the main or driven and counter shafts, the gears of one of said shafts being movable endwise of its shaft to bring the mating gears severally into mesh and a pawl-and-ratchet mechanism for transmitting driving power from the motor to the counter shaft.

5. In a transmission-gear for motor-vehicles, the combination with a motor-shaft, a main or driven shaft and a counter-shaft, of mating gear-wheels fixed non-rotative on the main or driven and counter shafts, the gears of one of said shafts being movable endwise of its shaft to bring the mating gears severally into mesh, and meshing gear-wheels fixed to and transmitting driving power from the motor to the counter shaft, one of said meshing gear-wheels comprising an inner part fixed to its shaft and an outer part capable of rotation on said inner part, and a pawl-and-ratchet mechanism operatively connecting said inner and outer parts of said gear-wheel.

6. In a transmission-gear for motor-vehicles, the combination with a motor-shaft, a main or driven shaft and a counter-shaft, of mating gear-wheels fixed non-rotative on the main or driven and counter shafts, the gears of one of said shafts being movable endwise of its shaft to bring the mating gears severally into mesh, driving connections between the motor and counter shaft operating to drive the counter-shaft from the motor-shaft while preventing transmission of driving power from the counter-shaft to the motor-shaft, and a clutch for connecting the motor-shaft to the main or driven shaft for direct drive.

7. In a transmission-gear for motor-vehicles, the combination with a motor-shaft, a main or driven shaft and a counter-shaft, of mating gear-wheels fixed non-rotative on the main or driven and counter shafts, the gears of one of said shafts being movable endwise of its shaft to bring the mating gears severally into mesh, and meshing gear-wheels fixed to and transmitting driving power from the motor to the counter shaft, one of said meshing gear-wheels comprising an inner part fixed to its shaft and an outer part capable of rotation on said inner part, a pawl-and-ratchet mechanism operatively connecting said inner and outer parts of said gear-wheel, and means operated by the momentum of said latter shaft to raise the pawls out of the path of the ratchet-teeth to avoid clicking of the pawls against the ratchet-teeth.

In testimony that I claim the foregoing as my invention I affix my signature, in presence of two witnesses, this 29th day of December, A. D. 1905.

ELWOOD HAYNES.

Witnesses:
C. H. HAYNES,
OMER F. SHAFER.